US012562323B2

(12) United States Patent
Döbler

(10) Patent No.: US 12,562,323 B2
(45) Date of Patent: Feb. 24, 2026

(54) CIRCUIT BREAKER DEVICE

(71) Applicant: Siemens Aktiengesellschaft, Munich (DE)

(72) Inventor: Fabian Döbler, Theilenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/696,529

(22) PCT Filed: Sep. 19, 2022

(86) PCT No.: PCT/EP2022/075901

§ 371 (c)(1),
(2) Date: Mar. 28, 2024

(87) PCT Pub. No.: WO2023/052163

PCT Pub. Date: Apr. 6, 2023

(65) Prior Publication Data

US 2024/0387121 A1 Nov. 21, 2024

(30) Foreign Application Priority Data

Sep. 28, 2021 (DE) ..................... 10 2021 210 829.6
Dec. 20, 2021 (EP) ..................................... 21216126

(51) Int. Cl.
*H01H 9/54* (2006.01)
*H01H 71/12* (2006.01)

(52) U.S. Cl.
CPC ............ *H01H 9/548* (2013.01); *H01H 9/547* (2013.01); *H01H 71/12* (2013.01); *H01H 71/125* (2013.01)

(58) Field of Classification Search
CPC ........ H01H 9/548; H01H 9/547; H01H 71/12; H01H 71/125
USPC ................. 318/400.26, 98; 361/100; 307/11; 335/7
See application file for complete search history.

(56) References Cited

U.S. PATENT DOCUMENTS 11,538,642 B2 12/2022 Hussmann
2008/0164961 A1 * 7/2008 Premerlani .......... H01H 1/0036 335/7
2020/0366078 A1 11/2020 Telefus et al.

FOREIGN PATENT DOCUMENTS

DE 202009014759 U1 2/2010
DE 102018213354 A1 2/2020

* cited by examiner

*Primary Examiner* — Arnold M Kinkead
(74) *Attorney, Agent, or Firm* — Laurence A. Greenberg; Werner H. Stemer; Ralph E. Locher

(57) ABSTRACT

A circuit breaker protects an electrical low-voltage circuit. The circuit breaker has a housing with first and second connections on the mains side and first and second connections on the load side, and an isolating contact unit connected to an electronic interrupting unit. The isolating contact unit can be switched by opening contacts to prevent current flow or by closing contacts for current flow in the low-voltage circuit. The electronic interrupting unit is switched by semiconductor-based switching elements into a high-impedance state for preventing the current flow or into a low-impedance state of the switching elements for the current flow in the low-voltage circuit. A current sensor determines the level of the current of the low-voltage circuit. A controller is connected to the current sensor, the isolating contact unit and the electronic interrupt unit, such that a first measuring impedance is provided between the first and the second load-side connection.

19 Claims, 3 Drawing Sheets

CIRCUIT BREAKER DEVICE

FIELD AND BACKGROUND OF THE INVENTION

The invention relates to the technical field of a circuit breaker device for a low-voltage circuit having an electronic interruption unit.

Low voltage is used to mean voltages of up to 1000 volts AC or up to 1500 volts DC. Low voltage is used to mean, in particular, voltages which are greater than the extra-low voltage, with values of 50 volts AC or 120 volts DC.

A low-voltage circuit or network or system is used to mean circuits having nominal currents or rated currents of up to 125 amperes, more specifically up to 63 amperes. A low-voltage circuit is used to mean, in particular, circuits having nominal currents or rated currents of up to 50 amperes, 40 amperes, 32 amperes, 25 amperes, 16 amperes or 10 amperes. The current values mentioned are used to mean, in particular, nominal, rated or/and switch-off currents, that is to say the current which is normally conducted at 19 most via the circuit, or for which the electrical circuit usually interrupted, for example by a protection device such as a circuit breaker device, a miniature circuit breaker or a power circuit breaker. The nominal currents can be scaled further from 0.5 A, via 1 A, 2 A, 3 A, 4 A, 5 A, 6 A, 7 A, 8 A, 9 A, 10 A, etc., to 16 A.

Miniature circuit breakers are overcurrent protection devices which have been known for a long time and are used in electrical installation technology in low-voltage circuits. They protect lines from damage caused by heating on account of an excessively high current and/or a short circuit. A miniature circuit breaker can automatically switch off the circuit in the event of an overload and/or a short circuit. A miniature circuit breaker is a fuse element which does not automatically reset.

In contrast to miniature circuit breakers, power circuit breakers are provided for currents of greater than 125 A, sometimes also even above 63 amperes. Miniature circuit breakers therefore have a simpler and more delicate design. Miniature circuit breakers usually have a fastening possibility for fastening on a so-called top-hat rail (mounting rail, DIN rail, TH35).

Miniature circuit breakers have an electromechanical design. In a housing, they have a mechanical switching contact or shunt opening release for interrupting (tripping) the electrical current. A bimetallic protection element or bimetallic element is usually used for tripping (interruption) in the case of a longer-lasting overcurrent (overcurrent protection) or in the event of a thermal overload (overload protection). An electromagnetic release with a coil is used for brief tripping if an overcurrent limit value is exceeded or in the event of a short circuit (short-circuit protection). One or more arc quenching chamber(s) or arc quenching devices are provided. Connection elements for conductors of the electrical circuit to be protected are also provided.

Circuit breaker devices having an electronic interruption unit are relatively new developments. They have a semiconductor-based electronic interruption unit. That is to say, the electrical current flow in the low-voltage circuit is conducted via semiconductor components or semiconductor switches which can interrupt the electrical current flow or can be switched to be conductive. Circuit breaker devices having an electronic interruption unit also often have a mechanical isolating contact system, in particular with isolator properties according to relevant standards for low-voltage circuits, wherein the contacts of the mechanical isolating contact system are connected in series with the electronic interruption unit, that is to say the current of the low-voltage circuit to be protected is conducted both via the mechanical isolating contact system and via the electronic interruption unit.

The present invention relates, in particular, to low-voltage AC circuits having an AC voltage, usually having a time-dependent sinusoidal AC voltage of the frequency f.

The temporal dependence of the instantaneous voltage value u(t) of the AC voltage is described by the equation:

$$u(t) = U * \sin(2\pi * f * t),$$

where:

u(t)=instantaneous voltage value at the time t

U=amplitude of the voltage

A harmonic AC voltage can be represented by the rotation of a phasor, the length of which corresponds to the amplitude (U) of the voltage. The instantaneous deflection is the projection of the phasor onto a coordinate system. An oscillation period corresponds to a full revolution of the phasor and its full angle is 2π (2pi) or 360°. The angular frequency is the rate of change of the phase angle of this rotating phasor. The angular frequency of a harmonic oscillation is always 2π times its frequency, that is to say:

$$\omega = 2\pi * f = 2\pi/T = \text{angular frequency of the AC voltage}$$

(T=period duration of the oscillation)

It is often preferred to give the angular frequency (ω) rather than the frequency (f), since many formulae in oscillation theory can be represented more compactly using the angular frequency due to the occurrence of trigonometric functions, the period of which is by definition 2π:

$$u(t) = U * \sin(\omega t)$$

In the case of angular frequencies that are not constant over time, the term instantaneous angular frequency is also used.

In the case of a sinusoidal AC voltage, in particular an AC voltage that is constant over time, the time-dependent value formed from the angular velocity ω and the time t corresponds to the time-dependent angle φ(t) which is also referred to as the phase angle φ(t). That is to say, the phase angle φ(t) periodically passes through the range 0 . . . 2π or 0° . . . 360°. That is to say, the phase angle periodically assumes a value of between 0 and 2π or 0° and 360° (φ=n*(0 . . . 2π) or φ=n* (0° . . . 360°) on account of periodicity; in abbreviated form: φ=0 . . . 2π or φ=0° . . . 360°).

The instantaneous voltage value u(t) is therefore used to mean the instantaneous value of the voltage at the time t, that is to say, in the case of a sinusoidal (periodic) AC voltage, the value of the voltage at the phase angle φ (φ=0 . . . 2π or φ=0° . . . 360°, of the respective period).

SUMMARY OF THE INVENTION

The object of the present invention is to improve a circuit breaker device of the type mentioned at the outset, in particular to improve the safety of such a circuit breaker device or to achieve greater safety in the electrical low-voltage circuit to be protected by the circuit breaker device.

This object is achieved by means of a circuit breaker device having the features of the independent circuit breaker device patent claim.

The invention proposes a circuit breaker device for protecting an electrical low-voltage circuit, in particular a low-voltage AC circuit, having:

a housing with a first and a second network-side connection (network-side connections) and a first and a second load-side connection (load-side connections); the first network-side connection and the first load-side connection (the first connections) are provided, in particular, for a phase conductor of the low-voltage circuit, and the second network-side connection and the second load-side connection (the second connections) are provided, in particular, for a neutral conductor of the low-voltage circuit, a mechanical isolating contact unit which is connected in series with an electronic interruption unit, wherein the mechanical isolating contact unit is assigned to the load-side connections and the electronic interruption unit is assigned to the network-side connections, wherein the mechanical isolating contact unit can be switched by opening contacts in order to avoid a current flow or closing the contacts for a current flow in the low-voltage circuit, wherein the electronic interruption unit can be switched, by means of semiconductor-based switching elements, to a high-impedance state of the switching elements in order to avoid a current flow or a low-impedance state of the switching elements for the current flow in the low-voltage circuit, a current sensor unit for determining the level of the current of the low-voltage circuit, a control unit which is connected to the current sensor unit, the mechanical isolating contact unit and the electronic interruption unit, wherein avoidance of a current flow in the low-voltage circuit is initiated if current limit values or/and current-time limit values are exceeded, wherein a first measurement impedance is provided between the first and second load-side connections, in such a manner that, when the contacts of the mechanical isolating contact unit are open, a current could flow from the first load-side connection to the second load-side connection via the measurement impedance.

According to the invention, a first measurement impedance is provided between the conductors at the load-side connections. The first measurement impedance is provided downstream of the mechanical isolating contact unit, as seen from the network-side connections, that is to say as seen from a potential energy source. That is to say, in the case of a circuit breaker device according to the invention which is in the as yet uninstalled state (or in the as yet unconnected state), the measurement impedance at the load-side connections can be determined using metrology when the contacts of the mechanical isolating contact unit are open. If the measurement impedance is a resistor, for example, its resistance value (plus potential line resistances) can be determined. Further units of the circuit breaker device are electrically isolated by the open contacts.

In other words: if there is no load at the load-side connections and the contacts of the mechanical isolating contact unit are closed and the electronic interruption unit has been switched to low impedance, a measurement current flows, via the network-side connections, through the electronic interruption unit, the closed contacts of the mechanical isolating contact unit and the first measurement impedance.

This has the particular advantage that the first measurement resistor can be used for the functional test of the circuit breaker device. A measurement current can therefore flow via the first measurement resistor. A defective mechanical isolating contact unit can therefore be determined, in particular, by positioning the first measurement resistor “at the end” of the circuit breaker device (in the direction of the load), that is to say downstream of the mechanical isolating contact unit, for example if contacts of the mechanical isolating contact unit are jammed or welded and do not open properly.

This configuration enables a safe circuit breaker device, thus increasing the safety in the low-voltage circuit for electrical consumers and persons.

Advantageous configurations of the invention are specified in the subclaims and in the exemplary embodiment.

In one advantageous configuration of the invention, the circuit breaker device is configured in such a manner that the first measurement impedance is used to determine a closed state of the contacts of the mechanical isolating contact unit, in particular when a load is not connected to the load-side connections. In particular, an unintended (incorrect) closed state of the contacts of the mechanical isolating contact unit is determined, for example if contacts are welded or jammed, for example as a result of excessively high currents.

This has the particular advantage that the safety of a circuit breaker device is increased since contacts which do not provide any DC isolation as touch or personal protection are detected. Furthermore, there is the advantage that voltages or signals are not delayed via the mechanical isolating contact unit (in particular when the contacts are open) by virtue of the passive measurement impedance (for example in contrast to when a voltage measurement connected to the control unit were provided instead of the measurement resistor). The measurement impedance is a purely passive element without a galvanic link to the control unit.

In one advantageous configuration of the invention, the mechanical isolating contact unit has a handle for opening and closing the contacts. Furthermore, a position sensor connected to the control unit can be provided and determines, in particular, the position of the handle and transmits it to the control unit.

This has the particular advantage that there is the functionality of a conventional miniature circuit breaker. Furthermore, the position of the handle and therefore an intended open or closed state of the mechanical isolating contact unit are determined, wherein the state can be compared with the state determined according to the invention and appropriate measures (coming to have a high impedance, signaling, etc.) can be taken in the event of discrepancies.

In one advantageous configuration of the invention, the mechanical isolating contact unit is configured in such a manner that the contacts can be opened, but not closed, by the control unit.

This has the particular advantage that there is increased protection and increased operational safety since fault-related closing of contacts by the control unit is not possible.

In one advantageous configuration of the invention, the circuit breaker device is configured in such a manner that, for the functional test of the circuit breaker device when the contacts of the mechanical isolating contact unit are open as intended and the electronic interruption unit has been switched to high impedance, the electronic interruption unit is switched to a low-impedance state for a first period of time, with the result that a measurement current flows via the first measurement impedance only when the contacts of the mechanical isolating contact unit have been closed in an unforeseen (incorrect) manner. In particular, the electronic interruption unit then remains in a high-impedance state or/and a fault state of the circuit breaker device is signaled.

This has the particular advantage that a test for contacts which have been incorrectly closed can be carried out in a relatively simple manner even though a consumer or load is not connected to the circuit breaker device (load-side connections), wherein the first measurement impedance causes a detectable measurement current for the functional test.

In the example, the electronic interruption unit is switched from the high-impedance state to the low-impedance state for a first period of time and is then in the high-impedance state again.

The first period of time may be in the range of 100 μs to 1 s, for example 100 μs, 200 μs, . . . , 1 ms, 2 ms, . . . , 10 ms, 11 16 ms, . . . , 20 ms, 21 ms, . . . , 100 ms, . . . , 200 ms, . . . 1 s.

In the case of switching times in the range of 1 ms to 2 ms, a current change for the functional test can be detected relatively easily. In particular, switching times of up to 10 ms are advantageous in order to ensure personal protection despite a fault.

In one advantageous configuration of the invention, the circuit breaker device is configured in such a manner that the level of the voltage across the electronic interruption unit can be determined for one conductor.

This has the particular advantage that there is a further possible way of determining contacts which have been closed in an unforeseen/incorrect manner.

In one advantageous configuration of the invention, the circuit breaker device is configured in such a manner that, for the functional test of the circuit breaker device when the contacts of the mechanical isolating contact unit are open as intended, the level of the voltage across the electronic interruption unit, as determined by the first measurement impedance, when the electronic interruption unit has been switched to high impedance is determined, that there is a first fault condition if a first voltage threshold value is exceeded, with the result that the electronic interruption unit is prevented from coming to have a low impedance or/and a fault state of the circuit breaker device is signaled.

A useful first voltage threshold value can be selected on the basis of the dimensioning of the level of the measurement impedance and the impedance of the high-impedance electronic interruption unit. A first voltage threshold value that is greater than 0.4 times the applied nominal voltage UN or UNetz (in particular root-mean-square value) of the low-voltage circuit (>0.4*UN) is usually useful. First voltage threshold values of >(0.4; 0.5; 0.6; 0.7; 0.8 or 0.9)*UN are more especially useful.

This has the particular advantage that, in addition to the determination by monitoring the current, there is monitoring by determining the level of the voltage, which is advantageous, in particular, in the case of large values of the measurement impedance (low currents). A further advantage over the current-based variant is that the electronic interruption unit need not be switched to low impedance (switched on) and therefore unintentional supply of a possibly connected consumer/load is avoided.

In one advantageous configuration of the invention, a second measurement impedance is provided between conductors of the low-voltage circuit in such a manner that, when the contacts of the mechanical isolating contact unit are open and the electronic interruption unit has been switched to low impedance, a measurement current flows through the electronic interruption unit via the network-side connections.

A further measurement current can flow through the second measurement impedance provided, for example, between two conductors upstream of the mechanical isolating contact unit (assigned to the load-side connection) when the contacts of the mechanical isolating contact unit are open.

The further measurement current can be advantageously used for the further functional test of the circuit breaker device, in particular in order to determine a faulty electronic interruption unit. This configuration therefore makes it possible to further increase the safety of a circuit breaker device, thus further increasing the safety in the low-voltage circuit.

In one advantageous configuration of the invention, the (first or/and second) measurement impedance is an electrical resistor or/and capacitor, that is to say a single element or a series or parallel circuit or a series and parallel circuit comprising two, three, four, five . . . elements. In one advantageous configuration of the invention, the measurement impedance is a series circuit comprising an electrical resistor and a capacitor. In one advantageous configuration of the invention, the measurement impedance has a high resistance or impedance value, in particular the resistance value is greater than 100 kOhm, 500 kOhm, 1 MOhm, 2 MOhm, 3 MOhm, 4 MOhm or 5 MOhm.

In a 230 volt (nominal voltage UN-root-mean-square value) low-voltage circuit, the use of a measurement resistor as a measurement impedance of 1 MOhm, for example, leads to losses of approximately 50 mW.

In one advantageous configuration of the invention, the level of the value of the measurement impedance should be such that the current through the measurement impedance is less than 1 mA when the network voltage is applied (in the nominal range), with the result that the losses in the measurement impedance are (negligibly) small. The (measurement) current of less than 0.1 mA is preferred.

This has the particular advantage that heating in the circuit breaker device is kept low by the measurement impedance.

In one advantageous configuration of the invention, the circuit breaker device is configured in such a manner that, for the functional test of the circuit breaker device when the contacts of the mechanical isolating contact unit are open and the electronic interruption unit has been switched to high impedance, the electronic interruption unit is switched to a low-impedance state for a/the first period of time, with the result that a measurement current flows via the second measurement impedance, that the expected level of the measurement current via the second measurement impedance is compared with a first threshold value and, if said threshold value is exceeded (an unintended closed state of the contacts of the mechanical isolating contact unit can be inferred, with the result that), the electronic interruption unit then remains in a high-impedance state or/and a fault state of the circuit breaker device is signaled.

This has the particular advantage that there is a further possible way of determining contacts which have been closed in an unforeseen/incorrect manner, thus making it possible to implement a circuit breaker device with increased safety.

In one advantageous configuration of the invention, the circuit breaker device is configured in such a manner that the level of the voltage across the electronic interruption unit can be determined for one conductor.

This has the particular advantage that there is a further possible way of determining contacts which have been closed in an unforeseen/incorrect manner.

In one advantageous configuration of the invention, the circuit breaker device is configured in such a manner that, when the contacts of the mechanical isolating contact unit are open as intended, the level of the voltage across the electronic interruption unit, as determined by the second measurement impedance, when the electronic interruption unit has been switched to high impedance is determined, that there is a second fault condition if a second voltage threshold value is exceeded, with the result that the electronic interruption unit is prevented from coming to have a low impedance or/and a fault state of the circuit breaker device is signaled.

That is to say, there is no fault condition if the second voltage threshold value is undershot.

The second voltage threshold value depends on the ratio of the level of the impedance of the electronic interruption unit to the level of the impedance of the measurement impedance. The second voltage threshold value may be, for example, less than a quarter of the level of the nominal voltage (UN) of the low-voltage circuit (0.25*UN). In this patent application, nominal voltage is used to mean, in particular, the network voltage that is actually present or applied (at/to the circuit breaker device). The voltage ratio through the voltage divider remains constant. The switch voltage changes if the network voltage is changed.

This has the particular advantage that, in addition to the determination by monitoring the current, there is monitoring by determining the level of the voltage, which is advantageous, in particular, in the case of large values of the (first or/and) second measurement impedance (low currents).

In one advantageous configuration of the invention, when the contacts of the mechanical isolating contact unit are closed and the interruption unit has a low impedance and

- when a current that exceeds a first current value is determined, in particular the first current value is exceeded for a first time limit, the electronic interruption unit comes to have a high impedance and the mechanical isolating contact unit remains closed,
- when a current that exceeds a second current value, in particular for a second time limit, is determined, the electronic interruption unit comes to have a high impedance and the mechanical isolating contact unit is opened,
- when a current that exceeds a third current value is determined, the electronic interruption unit comes to have a high impedance and the mechanical isolating contact unit is opened.

This has the particular advantage that there is a graduated switch-off concept in the case of increased currents for a circuit breaker device according to the invention.

In one advantageous configuration of the invention, the control unit has a microcontroller.

This has the particular advantage that the functions according to the invention for increasing the safety of a circuit breaker device or of the electrical low-voltage circuit to be protected can be implemented by means of a (customizable) computer program product. Furthermore, changes and improvements in the function can thereby be individually loaded onto a circuit breaker device.

In one advantageous configuration of the invention, the circuit breaker device may also be configured in such a manner that one or more refinements are provided:

- a mechanical isolating contact unit, in particular a two-pole mechanical isolating contact unit, having load-side connection points and network-side connection points, wherein the load-side connection points are connected to load-side neutral and phase conductor connections,
- an electronic interruption unit, in particular a single-pole electronic interruption unit,
- having a network-side connecting point which is electrically connected to the network-side phase conductor connection, and
- having a load-side connecting point which is connected to a network-side connection point of the mechanical isolating contact unit.

This advantageously makes it possible to implement a safe and also simple circuit breaker device.

In one advantageous configuration of the invention, a first voltage sensor unit connected to the control unit is provided and determines the level of a/the first voltage across the electronic interruption unit, in particular between the network-side connecting point and the load-side connecting point of the electronic interruption unit.

This has the particular advantage that there is a simple solution with only one voltage sensor unit.

In one advantageous configuration of the invention, a second voltage sensor unit connected to the control unit is alternatively provided and determines the level of a second voltage between the network-side neutral conductor connection and the network-side phase conductor connection. A third voltage sensor unit connected to the control unit is also provided and determines the level of a third voltage between the network-side neutral conductor connection and the load-side connecting point of the electronic interruption unit. The circuit breaker device is configured in such a manner that the level of a/the first voltage between the network-side connecting point and the load-side connecting point of the electronic interruption unit is determined from the difference between the second and third voltages.

This has the particular advantage that there is a further solution based on conventional voltage measurements. A further-reaching test of the circuit breaker device is also enabled.

In one advantageous configuration of the invention, the current sensor unit is provided on the circuit side between the network-side phase conductor connection and the load-side phase conductor connection.

This has the particular advantage that there is a compact two-part design of the device, with an electronic interruption unit in the phase conductor in addition to the current sensor unit, on the one hand, and a continuous neutral conductor, on the other hand. Furthermore, further monitoring of currents both in the circuit itself and in the case of a faulty link of a phase conductor to ground/a ground conductor is achieved with a current sensor unit in the phase conductor.

According to the invention, it is possible to provide a corresponding method for a circuit breaker device for a low-voltage circuit having electronic (semiconductor-based) switching elements that has the same and further advantages.

The invention can claim a corresponding computer program product. The computer program product comprises instructions which, when the program is executed by a microcontroller, cause the latter to improve the safety of such a circuit breaker device or to achieve greater safety in the electrical low-voltage circuit to be protected by the circuit breaker device.

The microcontroller is part of the circuit breaker device, in particular the control unit.

The invention can claim a corresponding computer-readable storage medium on which the computer program product is stored.

The invention can claim a corresponding data carrier signal which transmits the computer program product.

All configurations, both in dependent form referring back to the independent circuit breaker device patent claim, and referring back only to individual features or combinations of features of patent claims, improve a circuit breaker device, in particular improve the safety of a circuit breaker device and consequently of the electrical circuit, and provide a new concept for a circuit breaker device.

The described properties, features and advantages of this invention and the manner in which they are achieved become clearer and more distinctly comprehensible in connection with the following description of the exemplary embodiments which are explained in more detail in connection with the rawing.

DETAILED DESCRIPTION OF THE INVENTION

Figure 1:
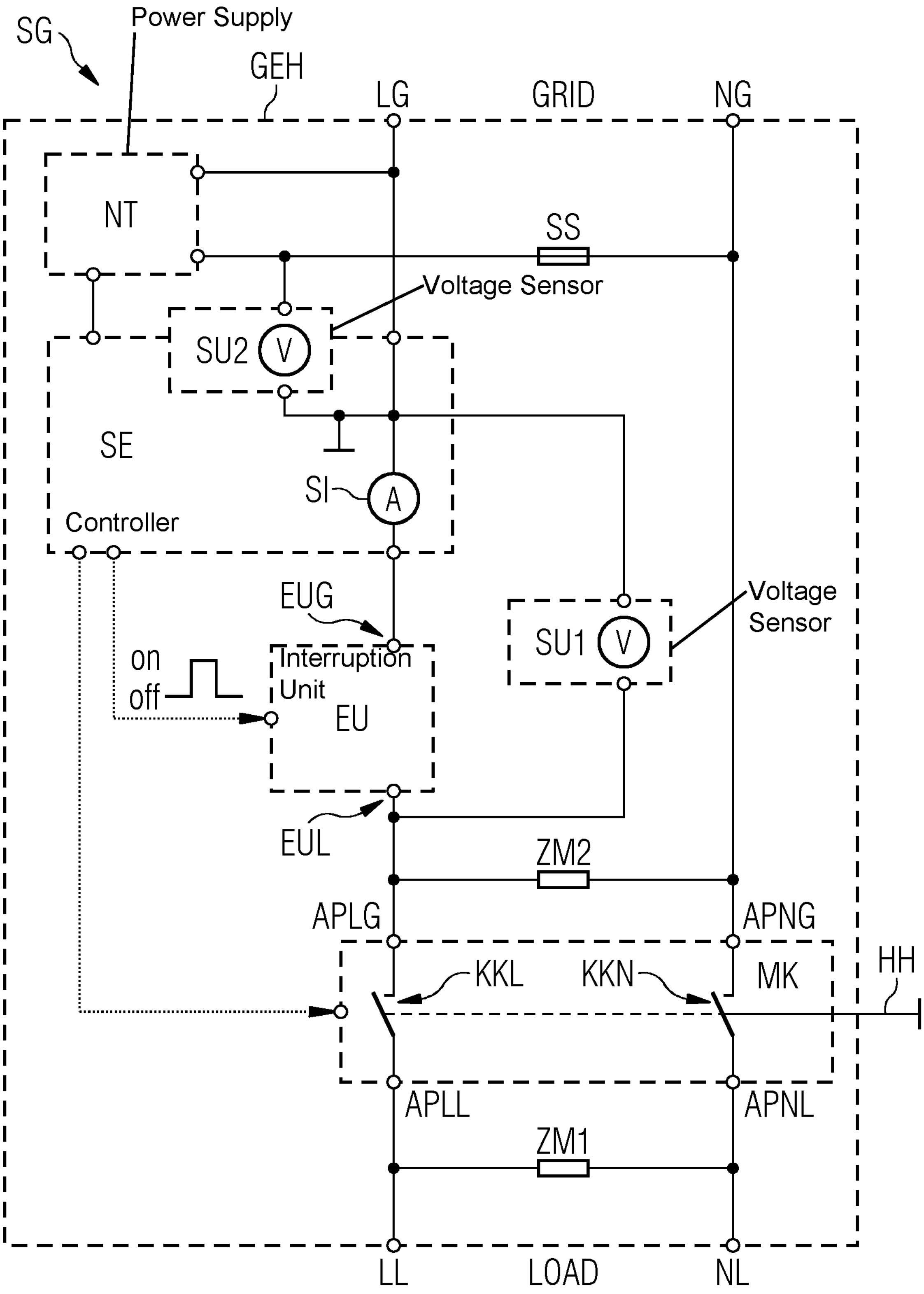
FIG. 1 shows a first illustration of a circuit breaker device.

FIG. 1 shows an illustration of a circuit breaker device SG for protecting an electrical low-voltage circuit, in particular a low-voltage AC circuit, having a housing GEH, having:

- a network-side neutral conductor connection NG, a network-side phase conductor connection LG, a load-side neutral conductor connection NL, a load-side phase conductor connection LL of the low-voltage circuit;
- an energy source is usually connected to the network side GRID,
- a consumer or load is usually connected to the load side LOAD;
- a (two-pole) mechanical isolating contact unit MK having load-side connection points APLL, APNL and network-side connection points APLG, APNG,
- wherein a load-side connection point APNL is provided for the neutral conductor, a load-side connection point APLL is provided for the phase conductor, a network-side connection point APNG is provided for the neutral conductor, and a network-side connection point APLG is provided for the phase conductor. The load-side connection points APNL, APLL are connected to the load-side neutral and phase conductor connections NL, LL, with the result that opening of contacts KKN, KKL in order to avoid a current flow or closing of the contacts for a current flow in the low-voltage circuit can be switched,
- an electronic interruption unit EU, in particular a single-pole electronic interruption unit (which is arranged, in particular, in the phase conductor in the case of a single-pole design),
- having a network-side connecting point EUG which is electrically connected to the network-side phase conductor connection LG, and
- a load-side connecting point EUL which is electrically connected to the network-side connection point APLG of the mechanical isolating contact unit MK,
- wherein the electronic interruption unit has or can be switched to, by virtue of semiconductor-based switching elements, a high-impedance state of the switching elements in order to avoid a current flow or a low-impedance state of the switching elements for the current flow in the low-voltage circuit,
- a current sensor unit SI for determining the level of the current of the low-voltage circuit, which current sensor unit is arranged, in particular, in the phase conductor,
- a control unit SE which is connected to the current sensor unit SI, the mechanical isolating contact unit MK and the electronic interruption unit EU, wherein avoidance a current flow in the low-voltage circuit is initiated if current limit values or/and current-time limit values are exceeded.

According to the invention, a first measurement impedance ZM1 is provided between conductors of the low-voltage circuit in such a manner that, when the contacts of the mechanical isolating contact unit are open, a current could flow from the load-side connection/load-side neutral conductor connection NL, via the measurement impedance, to the second load-side connection/load-side phase conductor connection LL.

This can be carried out in such a manner that the first measurement impedance ZM1 is connected between the load-side neutral conductor connection NL and the load-side phase conductor connection LL. The first measurement impedance ZM1 may be, for example, an electrical resistor or/and capacitor. In particular, the measurement impedance may be a series circuit or(/and) a parallel circuit comprising a resistor or/and a capacitor.

Furthermore, a second measurement impedance ZM2 may be provided according to the invention between conductors of the low-voltage circuit in such a manner that, when the contacts of the mechanical isolating contact unit are open and the electronic interruption unit has been switched to low impedance, a measurement current flows through the electronic interruption unit via the network-side connections.

This can be carried out in such a manner that a second measurement impedance ZM2 is connected between the network-side connection points APLG, APNG of the mechanical isolating contact unit MK. The second measurement impedance ZM2 may likewise be, for example, an electrical resistor or/and capacitor. In particular, the measurement impedance may be a series circuit or(/and) a parallel circuit comprising a resistor or/and a capacitor.

As a result of the second measurement impedance ZM2, a defined potential is generated in the circuit breaker device, in particular a defined voltage potential across the electronic interruption unit EU. Furthermore, a defined measurement current is generated in the circuit breaker device, without a connected consumer/load being affected by this.

Both the measurement current, caused by the first or/and second measurement impedance, and (or/and) the voltage across certain units, for example the electronic interruption unit EU, can be evaluated according to the invention.

The correct behavior of the units, in particular of the electronic interruption unit EU, can be captured by means of the evaluation.

The first measurement impedance determines, in particular, an abnormal behavior of the mechanical isolating contact unit, in particular when a consumer or load is not connected.

The (first and/or second) measurement impedance ZM1, ZM2 should have a very high value (resistance or impedance value) in order to keep the losses low, for example a value of 1 MOhm, for example, in the case of a resistor. A value of 1 MOhm leads to losses of approximately 50 mW in a 230 V low-voltage circuit.

The measurement impedance should be greater than 100 kOhm, 500 kOhm, 1 MOhm, 2 MOhm, 3 MOhm, 4 MOhm or preferably 5 MOhm.

The circuit breaker device can be configured in such a manner that the level of the voltage across the electronic interruption unit can be determined. That is to say, the level of a first voltage between the network-side connecting point EUG and the load-side connecting point EUL of the electronic interruption unit EU can be or is determined.

For this purpose, in the example according to FIG. 1, a first voltage sensor unit SU1 connected to the control unit SE is provided and determines the level of the voltage between the network-side connecting point EUG and the load-side connecting point EUL of the electronic interruption unit EU.

During the voltage measurement by the first voltage sensor unit SU1, the voltage across the series circuit comprising the electronic interruption unit EU and the current sensor SI can alternatively also be determined, as illustrated in FIG. 1. The current sensor unit SI has a very low internal resistance, with the result that the determination of the level of the voltage is not impaired or is negligibly impaired.

A second voltage sensor unit SU2 which determines the level of the voltage between the network-side neutral conductor connection NG and the network-side phase conductor connection LG may advantageously be provided.

The first voltage sensor unit may also be replaced by using two voltage measurements (upstream of the electronic interruption unit and downstream of the electronic interruption unit). The voltage across the electronic interruption unit is determined by forming a difference.

A/the second voltage sensor unit SU2 connected to the control unit SE may therefore be provided and determines the level of a second voltage between the network-side neutral conductor connection NG and the network-side phase conductor connection LG. Furthermore, a third voltage sensor unit SU3 (not illustrated) connected to the control unit may be provided and determines the level of a third voltage between the network-side neutral conductor connection NG and the load-side connecting point EUL of the electronic interruption unit EU. The circuit breaker device is configured in such a manner that the level of a/the first voltage between the network-side connecting point EUG and the load-side connecting point EUL of the electronic interruption unit EU is determined from the difference between the second and third voltages.

In the example according to FIG. 1, the electronic interruption unit EU has a single-pole design, in the phase conductor in the example. In this case, the network-side connection point APNG for the neutral conductor of the mechanical isolating contact unit MK is connected to the network-side neutral conductor connection NG of the housing GEH.

The circuit breaker device SG is advantageously configured in such a manner that the contacts of the mechanical isolating contact unit MK can be opened, but not closed, by the control unit SE, which is indicated by an arrow from the control unit SE to the mechanical isolating contact unit MK.

The mechanical isolating contact unit MK can be operated by means of a mechanical handle HH on the circuit breaker device SG in order to switch manual opening or closing of the contacts KKL, KKN. The mechanical handle HH indicates the switching state (open or closed) of the contacts of the mechanical isolating contact unit MK.

Furthermore, the position of the handle (closed or open) can be transmitted to the control unit SE. The position of the handle can be determined by means of a (position) sensor, for example.

The mechanical isolating contact unit MK is advantageously configured in such a manner that the contacts can be (manually) closed by means of the mechanical handle only after an enable (enable), in particular an enable signal.

This is likewise indicated by the arrow from the control unit SE to the mechanical isolating contact unit MK. That is to say, the contacts KKL, KKN of the mechanical isolating contact unit MK can be closed by means of the handle HH only when the enable or the enable signal (from the control unit) is present. Without the enable or the enable signal, although the handle HH can be actuated, the contacts cannot be closed ("permanent slider contacts"). The circuit breaker device SG has an energy supply NT, for example a power supply unit. In particular, the energy supply NT is provided for the control unit SE, which is indicated by a link between the energy supply NT and the control unit SE in FIG. 1. The energy supply NT is connected (on the other hand) to the network-side neutral conductor connection NG and the network-side phase conductor connection LG. A fuse SS, in particular a safety fuse, may be advantageously provided in the link to the network-side neutral conductor connection NG (or/and phase conductor connection LG).

Alternatively, in the case of a second measurement impedance ZM2, the latter may be connected to the network-side neutral conductor connection NG via the fuse SS.

This advantageously makes it possible to implement a three-pole electronic unit EE (FIG. 3), for example in the form of a module, having three connection points, one neutral conductor connection point and two phase conductor connection points. The electronic unit EE has, for example, the electronic interruption unit EU, the control unit SE, the energy supply NT (in particular including the fuse SS), the current sensor unit SI, the first voltage sensor unit SU1 and optionally the second voltage sensor unit SU2.

The low-voltage circuit may be a three-phase AC circuit having one neutral conductor and three phase conductors. The circuit breaker device may be configured as a three-phase variant for this purpose and may have, for example, further network-side and load-side phase conductor connections. In a similar manner, a series circuit comprising an electronic interruption unit or its semiconductor-based switching elements and a contact of the mechanical isolating contact unit is respectively provided between the further network-side and load-side phase conductor connections. The first or/and second measurement impedance may be respectively provided between the phase conductor and the neutral conductor or/and between the phase conductors.

High impedance is used to mean a state in which only a current of a negligible magnitude flows. In particular, high impedance is used to mean resistance values of greater than 1 kilohm, preferably greater than 10 kilohms, 100 kilohms, 1 megaohm, 10 megaohms, 100 megaohms, 1 gigaohm or greater.

Low impedance is used to mean a state in which the current value indicated on the circuit breaker device could flow.

In particular, low impedance is used to mean resistance values of less than 10 ohms, preferably less than 1 ohm, 100 milliohms, 10 milliohms, 1 milliohm or less.

Figure 2:
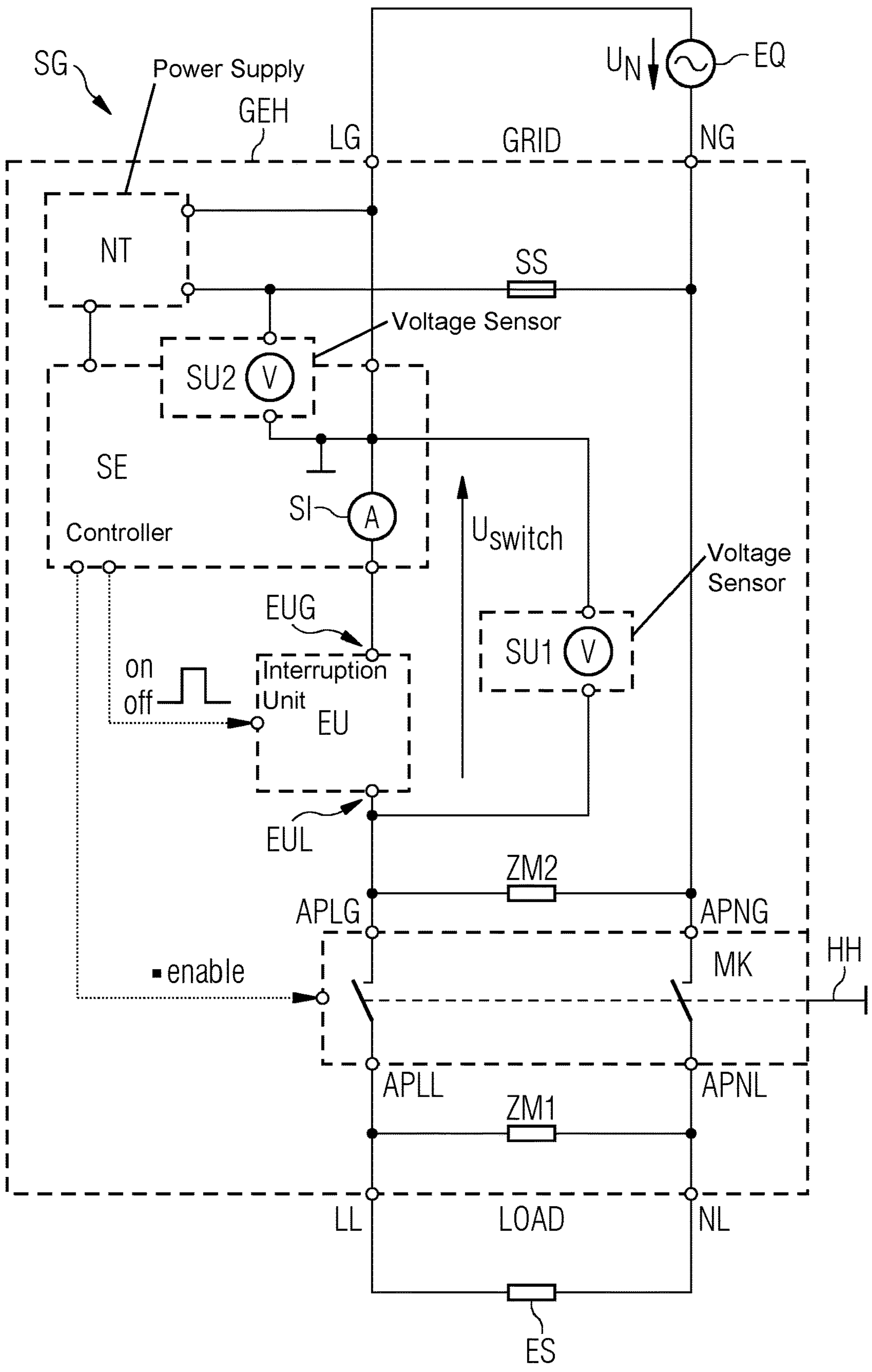
FIG. 2 shows a second illustration of a circuit breaker device.

FIG. 2 shows a representation according to FIG. 1, with the difference that an energy source EQ with a nominal voltage UN of the low-voltage circuit is connected to the network side GRID. The nominal voltage UN is also intended to be applied between the network-side neutral conductor connection NG and the network-side phase conductor connection LG. In this patent application, nominal voltage is used to mean the network voltage that is actually present or applied (at/to the circuit breaker device). This may be determined in the circuit breaker device by means of the second voltage sensor unit SU2.

The voltage drop $U_{switch}$ across the electronic interruption unit EU can be determined by means of the first voltage sensor unit SU1.

Furthermore, a consumer or energy sink ES is connected to the load side LOAD.

Furthermore, an enable signal enable is depicted for the link from the control unit SE to the mechanical isolating contact unit MK.

The mechanical isolating contact unit MK is illustrated in an open state OFF, that is to say with open contacts KKN, KKL in order to avoid a current flow.

The circuit breaker device SG operates, in principle, for example, in such a manner that, when the contacts of the mechanical isolating contact unit are closed and the interruption unit has a low impedance and

- when a current that exceeds a first current value is determined, in particular the first current value is exceeded for a first time limit, the electronic interruption unit EU comes to have a high impedance and the mechanical isolating contact unit MK remains closed,
- when a current that exceeds a higher second current value, in particular for a second time limit, is determined, the electronic interruption unit EU comes to have a high impedance and the mechanical isolating contact unit MK is opened,
- when a current that exceeds an even higher third current value is determined, the electronic interruption unit comes to have a high impedance and the mechanical isolating contact unit MK is opened.

Figure 3:
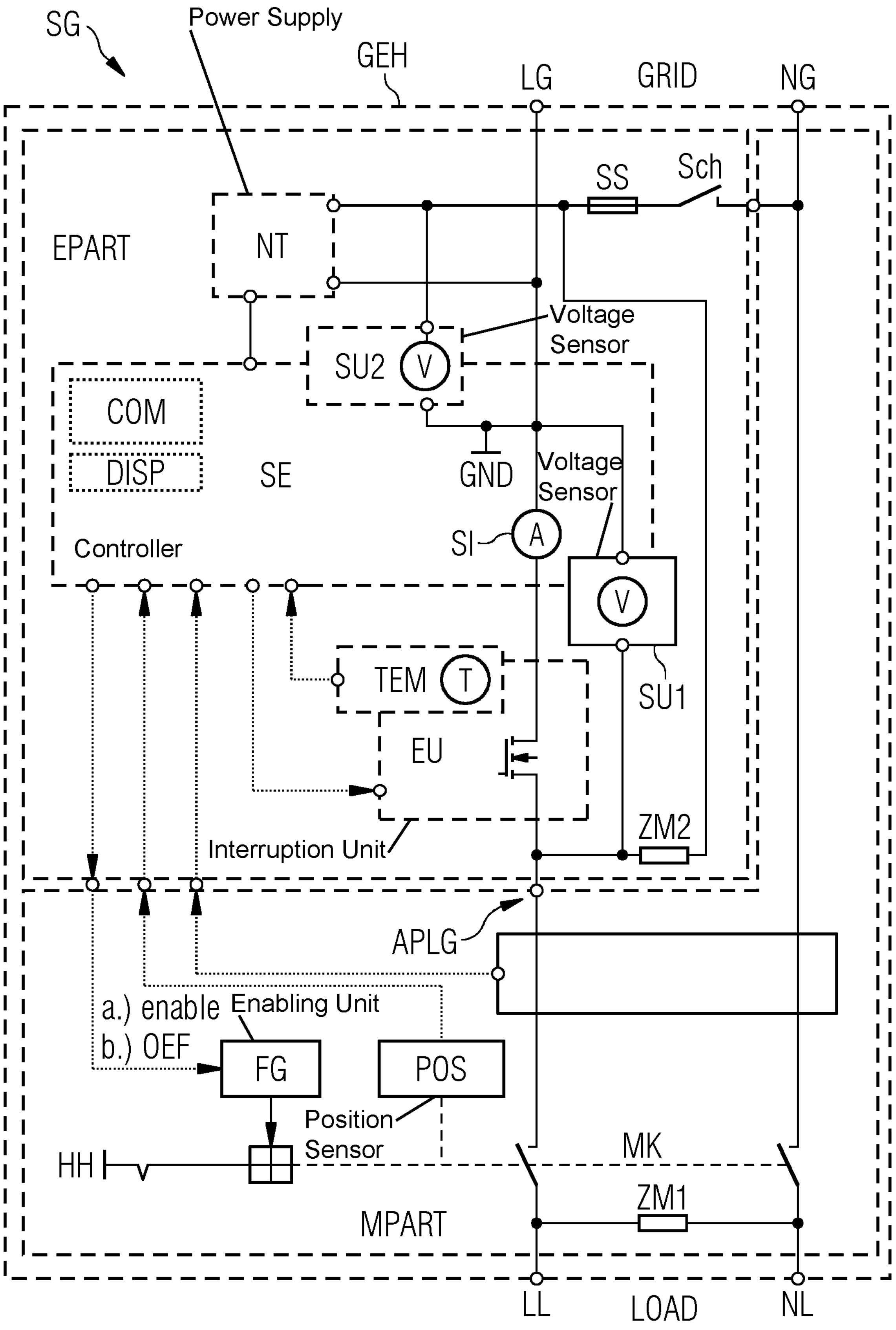
FIG. 3 shows a third illustration of a circuit breaker device.

FIG. 3 shows an illustration according to FIGS. 1 and 2, with the difference that the circuit breaker device has a two-part design. It contains an electronic first part EPART, for example on a printed circuit board. The first part EPART may have the control unit SE, the second measurement impedance ZM2, the current sensor unit SI, the electronic interruption unit EU and the energy supply NT. The first part may also have the first voltage sensor unit SU1, the second voltage sensor unit SU2, the safety fuse SS, a switch SCH, a temperature sensor TEM (in particular for the electronic interruption unit EU), a communication unit COM, and a display unit DISP.

The first part EPART has only three connections:

- the network-side phase conductor connection LG,
- a connection for or to the network-side phase conductor connection point APLG of the mechanical isolating contact unit MK,
- a connection for a link to the network-side neutral conductor connection NG.

The circuit breaker device contains a second part MPART, in particular a mechanical second part. The second part MPART may have the mechanical isolating contact unit MK, the handle HH and an enabling unit FG. The second part may also have a position unit POS for reporting the position of the contacts of the mechanical isolating contact unit MK to the control unit and the (neutral conductor) link(s). The second part MPART contains the first measurement impedance ZM1 in this example.

Further units which are not described in any more detail may be provided.

A compact circuit breaker device according to the invention can be advantageously implemented by virtue of the two-part design.

The enabling unit FG enables the actuation of the contacts of the mechanical isolating contact unit by means of the handle HH if there is an enable signal enable.

The invention shall be summarized and explained in more detail again below.

A typical fault pattern of contacts of mechanical isolating contact units MK is the welding of the contact surfaces, as a result of which it is no longer possible to open the contact. However, it is also possible that a contact can no longer be closed.

For the safe operational management of a circuit breaker device, reliable detection of the switching state of the contacts would be desirable and, on the other hand, the detection of a faulty mechanical isolating contact unit.

It is advantageous to query the switching state of the contacts using different measurement principles in order to be able to determine this important information in a redundant manner. Furthermore, it is advantageous if as few additional components as possible are needed to detect the state.

One possibility is to monitor the position of the handle, for example by means of Hall sensors or end position sensing devices. In this case, it is conventional to capture an (absolute) end position. If, for example, a contact welds upon opening, a handle may remain, for example, in an intermediate position between “closed” and “disconnected”. This state then cannot be clearly evaluated. Another case is if the handle is held in the on position (closed) and a trip-free mechanism opens the contacts. The sensor still captures the on position of the handle, but the contact is already open.

The switching state could be determined by determining the voltage across the contact, but this method fails when no consumer (or load) is connected, that is to say in the unloaded case of the circuit breaker device.

According to the invention, a first measurement impedance at the load-side connection (between the mechanical isolating contact unit and the load-side connections) is proposed.

An incorrect or unintended state of the contacts of a mechanical isolating contact unit can be determined by measuring and evaluating the current, voltage or impedance (in the case of purely resistive measurement impedance(s): resistance values).

This is intended to be explained, by way of example, using the following voltage or impedance ratios.

The following voltage ratios result with the additional first measurement impedance ZM1.

Where:

$Z_{elswitchoff}$ Impedance value of the electronic interruption unit in the high-impedance state $Z_{meas1}$ Impedance value of the first measurement impedance ZM1

$Z_{meas2}$ Impedance value of the second measurement impedance ZM2

$Z_{load}$ Impedance value of a connected consumer ES

Contacts open:

$$\frac{U_{switch}}{U_N} = \frac{Z_{el\ switch\ off}}{Z_{el\ switch\ off} + Z_{meas2}}$$

Contacts closed:

Loaded (with a connected consumer ES):

$$\frac{U_{switch}}{U_N} = \frac{Z_{el\ switch\ off}}{Z_{el\ switch\ off} + \left(Z_{meas1}^{-1} + Z_{meas2}^{-1} + Z_{load}^{-1}\right)^{-1}}$$

Unloaded (without a connected consumer ES):

$$\frac{U_{switch}}{U_N} = \frac{Z_{el\ switch\ off}}{Z_{el\ switch\ off} + \left(Z_{meas1}^{-1} + Z_{meas2}^{-1}\right)^{-1}}$$

It can be seen that the switching states of the contacts can be clearly distinguished in the loaded and unloaded case.

In the closed, unloaded state, the output impedance of the circuit breaker device with the first and second measurement impedance ZM1, ZM2 converges toward the impedance value $Z_{meas1}\|Z_{meas2}$ (impedance value of the parallel circuit comprising both measurement impedances). Assuming that Zmeas1<<Zmeas2, the output impedance of the circuit breaker device in the closed, unloaded state with the first measurement impedance ZM1 converges toward the impedance value $Z_{meas1}$.

Without the first measurement impedance ZM1, the measured voltage when the contact is open without a load converges toward the voltage when the contacts are open.

The first measurement impedance ZM1 provides an upper limit for the maximum output impedance of the circuit breaker device, as a result of which the voltage ratios differ significantly from the case without the first measurement impedance ZM1 with an open isolator.

In the embodiments above, a resistive behavior was assumed for the impedance values. However, the method can likewise be used with complex impedances.

When using complex impedances, the phase angle of the measured voltages can optionally be evaluated for the measured voltage amplitude (or the root-mean-square value).

The evaluation of the voltages becomes more complex as a result, but it is possible to distinguish even more clearly between the switching states.

In one advantageous configuration, large measurement impedances are used to keep the losses low, wherein a different value is used for the level of the first measurement impedance than for the level of the second measurement impedance, for example:

$Z_{meas1}$=1 MΩ $Z_{meas2}$=2 MΩ

The impedance of the electronic interruption unit EU depends greatly on the circuit topology and its energy absorber. Typical values $|Z_{el\ switch\ off}|$=600 kΩ where this is a resistive-capacitive impedance.

The circuit breaker device is configured in such a manner that, for the functional test of the circuit breaker device when the contacts of the mechanical isolating contact unit MK are open as intended and the electronic interruption unit EU has been switched to high impedance, the electronic interruption unit EU is switched to a low-impedance state for a first period of time, with the result that a measurement current flows via the first measurement impedance only when the contacts of the mechanical isolating contact unit MK have been closed incorrectly or in an unforeseen manner. If a measurement current that is captured using the current sensor unit flows, an incorrectly closed state of the contacts can be concluded. The level of the measurement current is determined by the value of the level of the first measurement impedance ZM1. If an incorrectly closed state of the contacts is concluded because a measurement current is flowing, the level of which is in the range of the value of the level of the first measurement impedance ZM1, the electronic interruption unit can then remain in a high-impedance state, for example. Alternatively or additionally, this fault state of the circuit breaker device can be signaled.

Furthermore, the circuit breaker device may be configured in such a manner that, for the functional test of the circuit breaker device when the contacts of the mechanical isolating contact unit MK are open as intended, the level of the voltage across the electronic interruption unit, as determined by the first measurement impedance ZM1, when the electronic interruption unit EU has been switched to high impedance is determined. There is a first fault condition if a first voltage threshold value is exceeded. When the contacts are open and in the case of only the first measurement impedance, a very low voltage (ideally no voltage) (less than 10 volts) will usually be present across the electronic interruption unit. If a voltage is present, in particular at the level of the voltage determined by the first measurement impedance ZM1, incorrectly closed contacts can be concluded. As a result, the electronic interruption unit can be prevented from coming to have a low impedance. Alternatively or additionally, this fault state of the circuit breaker device can be signaled.

The circuit breaker device can be configured in such a manner that, for the functional test of the circuit breaker device when the contacts of the mechanical isolating contact unit MK are open and the electronic interruption unit EU has been switched to high impedance, the electronic interruption unit EU is switched to a low-impedance state for a/the first period of time, with the result that a measurement current flows via the second measurement impedance. The expected level of the measurement current via the second measurement impedance is compared with a first threshold value and, if the latter is exceeded, that is to say if the first measurement impedance reduces the impedance value as a result of the parallel circuit-a greater current flows, an unintended closed state of the contacts of the mechanical isolating contact unit MK can be inferred. Consequently, the electronic interruption unit can then remain in a high-impedance state. Alternatively or additionally, this fault state of the circuit breaker device can be signaled.

The circuit breaker device may also be configured in such a manner that, when the contacts of the mechanical isolating contact unit MK are open as intended, the level of the voltage across the electronic interruption unit, as determined by the second measurement impedance, when the electronic interruption unit EU has been switched to high impedance is determined. There is a second fault condition if a second voltage threshold value is exceeded since a higher voltage is dropped across the electronic interruption unit as a result of the unintended first measurement impedance, with the result that an unintended closed state of the contacts of the mechanical isolating contact unit MK can be inferred. Consequently, the electronic interruption unit may be prevented from coming to have a low impedance. Alternatively or additionally, this fault state of the circuit breaker device can be signaled.

An expected state of the contacts (closed, open), for example, can be reported or queried using a message indicating the position of the contacts.

The electronic interruption unit EU (or the electronic switch) is switched on for a very short time (in the milliseconds range), for example. A current or/and voltage measurement and (subsequent) evaluation make it possible to determine whether the intended (switching) state of the contacts (closed/open) corresponds to the real (switching) state of the contacts (closed/open).

Jammed or welded contacts can therefore be determined.

If the check is fault-free, a (first) enable condition to switch on the circuit breaker device, specifically the electronic interruption unit, can be present.

If the check is not fault-free, no enable to switch on the circuit breaker device will be effected, and there is a fault condition, with the result that the outgoing circuit or consumer/load cannot be switched on and a dangerous state is therefore prevented.

The present invention makes it possible to clearly detect the switching state of the contacts of a circuit breaker device or its mechanical isolating contact unit using the available current or (especially) voltage measurements in the loaded and unloaded states.

The additional, first measurement impedance ZM1 ($Z_{meas1}$) may likewise be used in the current-based determinations of the state of the contacts. In this case too, the first measurement impedance ZM1 defines a maximum output impedance and therefore firmly defined current levels in the unloaded state of the circuit breaker device. It is therefore always possible to clearly distinguish between open and closed contacts.

According to the invention, no additional measurements or sensors need to be used. The switching state is determined on the basis of purely electrical variables. It can possibly be compared with further captured positions.

Advantages

- Use of already available measurements
- Only one additional measurement impedance is required→favorable solution
- Clear detection of open and closed isolating contacts with and without a connected load
- Detection of welded contacts
- Independent of mechanical end position switches or Hall sensors
- Detection of the open contact even in the case of a free-trip mechanism.

This is not possible with a single position sensor which detects the on state of the handle.

Although the invention has been described and illustrated more specifically in detail by means of the exemplary embodiment, the invention is not restricted by the disclosed examples and other variations may be derived therefrom by a person skilled in the art without departing from the scope of protection of the invention.

The invention claimed is:

1. A circuit breaker for protecting an electrical low-voltage circuit, the circuit breaker comprising:

a housing having first and second network-side connections and first and second load-side connections;

an electronic interruption unit having semiconductor-based switching elements and being switched, by means of said semiconductor-based switching elements, to a high-impedance state to avoid a current flow or a low-impedance state of said semiconductor-based switching elements for allowing the current flow in the electrical low-voltage circuit;

a mechanical isolating contact unit connected in series with said electronic interruption unit, wherein said mechanical isolating contact unit is assigned to said load-side connections and said electronic interruption unit is assigned to said network-side connections, wherein said mechanical isolating contact unit having contacts being switched by opening said contacts to avoid the current flow or closing of said contacts for allowing the current flow in the electrical low-voltage circuit;

a current sensor for determining a level of a current of the electrical low-voltage circuit;

a controller connected to said current sensor, said mechanical isolating contact unit and said electronic interruption unit, wherein avoidance of the current flow in the electrical low-voltage circuit is initiated if current limit values or/and current-time limit values are exceeded, wherein said mechanical isolating contact unit is configured such that said contacts are opened, but not closed, by said controller; and a first measurement impedance disposed between said first and second load-side connections, such that, when said contacts of said mechanical isolating contact unit are open, a current could flow from said first load-side connection to said second load-side connection via said first measurement impedance.

2. The circuit breaker according to claim 1, wherein the circuit breaker is configured such that said first measurement impedance is used to determine a closed state of said contacts of said mechanical isolating contact unit.

3. The circuit breaker according to claim 1, wherein said mechanical isolating contact unit has a handle for opening and closing said contacts; and further comprising a position sensor connected to said controller and determining a position of said handle and transmits a determined position to said controller.

4. The circuit breaker according to claim 1, wherein the circuit breaker is configured such that, for a functional test of the circuit breaker when said contacts of said mechanical isolating contact unit are open as intended and said electronic interruption unit has been switched to the high-impedance state, said electronic interruption unit is switched to the low-impedance state for a first period of time, with a result that a measurement current flows via said first measurement impedance only when said contacts of said mechanical isolating contact unit have been closed in an incorrect/unforeseen manner.

5. The circuit breaker according to claim 1, wherein the circuit breaker is configured such that a level of a voltage across said electronic interruption unit can be determined for one conductor.

6. The circuit breaker according to claim 5, wherein the circuit breaker is configured such that:

for a functional test of the circuit breaker when said contacts of said mechanical isolating contact unit are open as intended, the level of the voltage across said electronic interruption unit, as determined by said first measurement impedance, when said electronic interruption unit has been switched to the high-impedance state is determined; and that there is a first fault condition if a first voltage threshold value is exceeded, with a result that said electronic interruption unit is prevented from coming to have the low-impedance state and/or a fault state of the circuit breaker is signaled.

7. The circuit breaker according to claim 1, further comprising a second measurement impedance disposed between conductors of the electrical low-voltage circuit such that, when said contacts of said mechanical isolating contact unit are open and said electronic interruption unit has been switched to the low-impedance state, a measurement current flows through said electronic interruption unit via said network-side connections.

8. The circuit breaker according to claim 1, wherein said first measurement impedance is an electrical resistor and/or capacitor.

9. The circuit breaker according to claim 1, wherein said first measurement impedance is a series circuit containing an electrical resistor and a capacitor.

10. The circuit breaker according to claim 1, wherein said first measurement impedance has a high resistance or impedance value.

11. The circuit breaker according to claim 7, wherein the circuit breaker is configured such that, for a functional test of the circuit breaker when said contacts of said mechanical isolating contact unit are open and said electronic interruption unit has been switched to the high-impedance state, said electronic interruption unit is switched to the low-impedance state for a first period of time, with a result that the measurement current flows via said second measurement impedance, that an expected level of the measurement current via said second measurement impedance is compared with a first threshold value and, if the first threshold value is exceeded, said electronic interruption unit then remains in the high-impedance state and/or a fault state of the circuit breaker is signaled.

12. The circuit breaker according to claim 7, wherein the circuit breaker is configured such that a level of a voltage across said electronic interruption unit can be determined for one conductor.

13. The circuit breaker according to claim 12, wherein:

the circuit breaker is configured such that, when said contacts of said mechanical isolating contact unit are open as intended, the level of the voltage across said electronic interruption unit, as determined by said second measurement impedance, when said electronic interruption unit has been switched to the high-impedance state is determined; and there is a second fault condition if a second voltage threshold value is exceeded, with a result that said electronic interruption unit is prevented from coming to have the low-impedance state and/or a fault state of the circuit breaker is signaled.

14. The circuit breaker according to claim 1, wherein when said contacts of said mechanical isolating contact unit are closed and said electronics interruption unit has the low-impedance state and:

if the current that exceeds a first current value is determined, said electronic interruption unit comes to have the high impedance state and said mechanical isolating contact unit remains closed;

if the current that exceeds a second current value is determined, said electronic interruption unit comes to have the high-impedance state and said mechanical isolating contact unit is opened; and if the current that exceeds a third current value is determined, said electronic interruption unit comes to have the high-impedance state and said mechanical isolating contact unit is opened.

15. The circuit breaker according to according to claim 1, wherein said controller has a microcontroller.

16. The circuit breaker according to claim 1, wherein the circuit breaker is configured such that said first measurement impedance is used to determine a closed state of said contacts of said mechanical isolating contact unit if a load is not connected to said load-side connections, and that an unintended closed state of said contacts of said mechanical isolating contact unit is determined.

17. The circuit breaker according to claim 1, wherein the circuit breaker is configured such that, for a functional test of the circuit breaker when said contacts of said mechanical isolating contact unit are open as intended and said electronic interruption unit has been switched to the high-impedance state, said electronic interruption unit is switched to the low-impedance state for a first period of time, with a result that a measurement current flows via said first measurement impedance only when said contacts of said mechanical isolating contact unit have been closed in an incorrect/unforeseen manner, and said electronic interruption unit then remains in the high-impedance state and/or a fault state of the circuit breaker is signaled.

18. The circuit breaker according to claim 10, wherein said first measurement impedance has a high resistance value, the high resistance value is greater than 100 kOhm, greater than 500 kOhm, greater than 1 MOhm, greater than 2 MOhm, greater than 3 MOhm, greater than 4 MOhm or greater than 5 MOhm.

19. The circuit breaker according to claim 14, wherein:

the first current value is exceeded for a first time limit; and the second current value is exceeded for a second time limit.

* * * * *